United States Patent [19]

vom Stein

[11] Patent Number: 4,646,909

[45] Date of Patent: Mar. 3, 1987

[54] APPARATUS FOR THE SEPARATION OF PALLETS ON A ROLLER CONVEYOR

[75] Inventor: Hans vom Stein, Wermelskirchen, Fed. Rep. of Germany

[73] Assignee: Interroll Fördertechnik GmbH & Co. KG, Wermelskirchen, Fed. Rep. of Germany

[21] Appl. No.: 731,158

[22] Filed: May 6, 1985

[30] Foreign Application Priority Data

May 9, 1984 [DE] Fed. Rep. of Germany ....... 3417158

[51] Int. Cl.$^4$ .............................................. B65G 47/26
[52] U.S. Cl. ................................. 198/460; 198/463.4; 198/634
[58] Field of Search ...................... 198/463.4, 459, 460, 198/781, 633, 634; 193/35 A

[56] References Cited

U.S. PATENT DOCUMENTS

| 3,035,683 | 5/1962 | Bishop . | |
|---|---|---|---|
| 3,605,994 | 3/1970 | Parlette . | |
| 3,669,244 | 6/1972 | Pagdin et al. . | |
| 3,890,755 | 6/1975 | Specht . | |
| 3,891,073 | 6/1975 | Coleman et al. | 193/35 A |
| 3,939,962 | 2/1976 | Gebhardt | 198/781 |
| 4,056,180 | 11/1977 | Gunti . | |
| 4,063,636 | 12/1977 | vom Stein . | |
| 4,108,303 | 8/1978 | Vogt et al. . | |
| 4,185,729 | 1/1980 | Obermeyer | 193/35 A |
| 4,399,908 | 8/1983 | Gunti . | |

FOREIGN PATENT DOCUMENTS 877122  8/1971  Canada ............................. 193/35 A Primary Examiner—Joseph E. Valenza
Assistant Examiner—Kyle E. Shane
Attorney, Agent, or Firm—Anthony J. Casella; Gerald E. Hespos

[57] ABSTRACT

In this apparatus for separating a pallet which is to be extracted from a rack at a removal side on a roller conveyor, a stop latch is provided for retaining following pallets, said latch being operated by a control flap connected by way of a rod and a toggle mechanism. The toggle mechanism comprises two arms. To define the collapsed position of the toggle mechanism there is provided on the toggle mechanism arm a projection which bears against the pivot pin of the other toggle mechanism arm. The extended position of the toggle mechanism is defined by stops which in the extended position bear either against the pivot pin of the toggle mechanism arm or the pivot pin of the stop latch.

6 Claims, 4 Drawing Figures

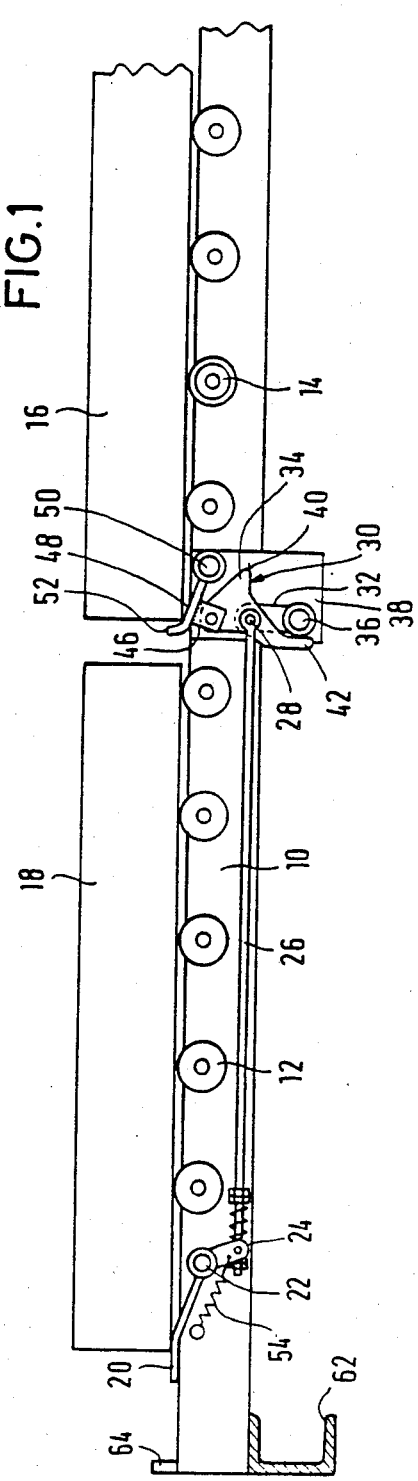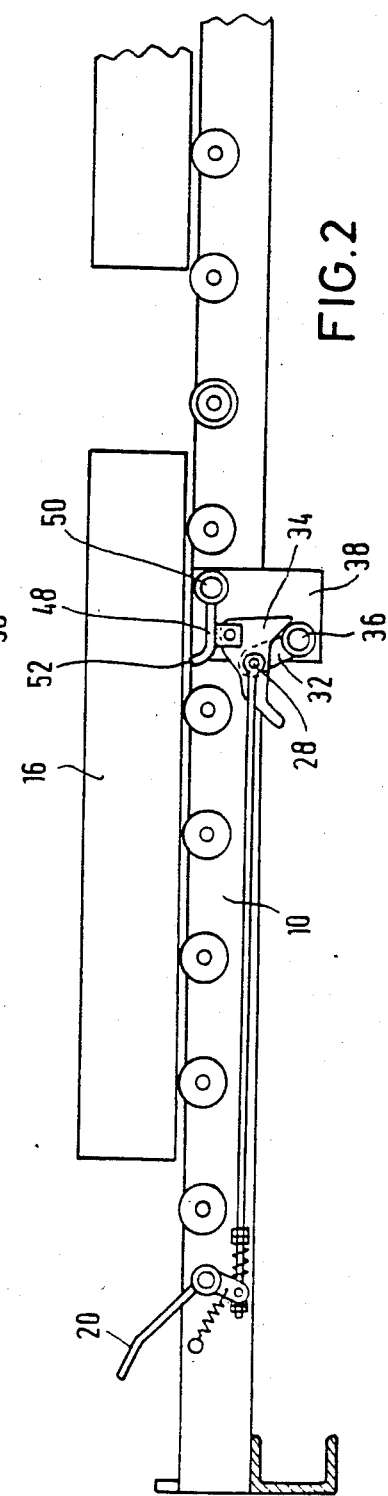

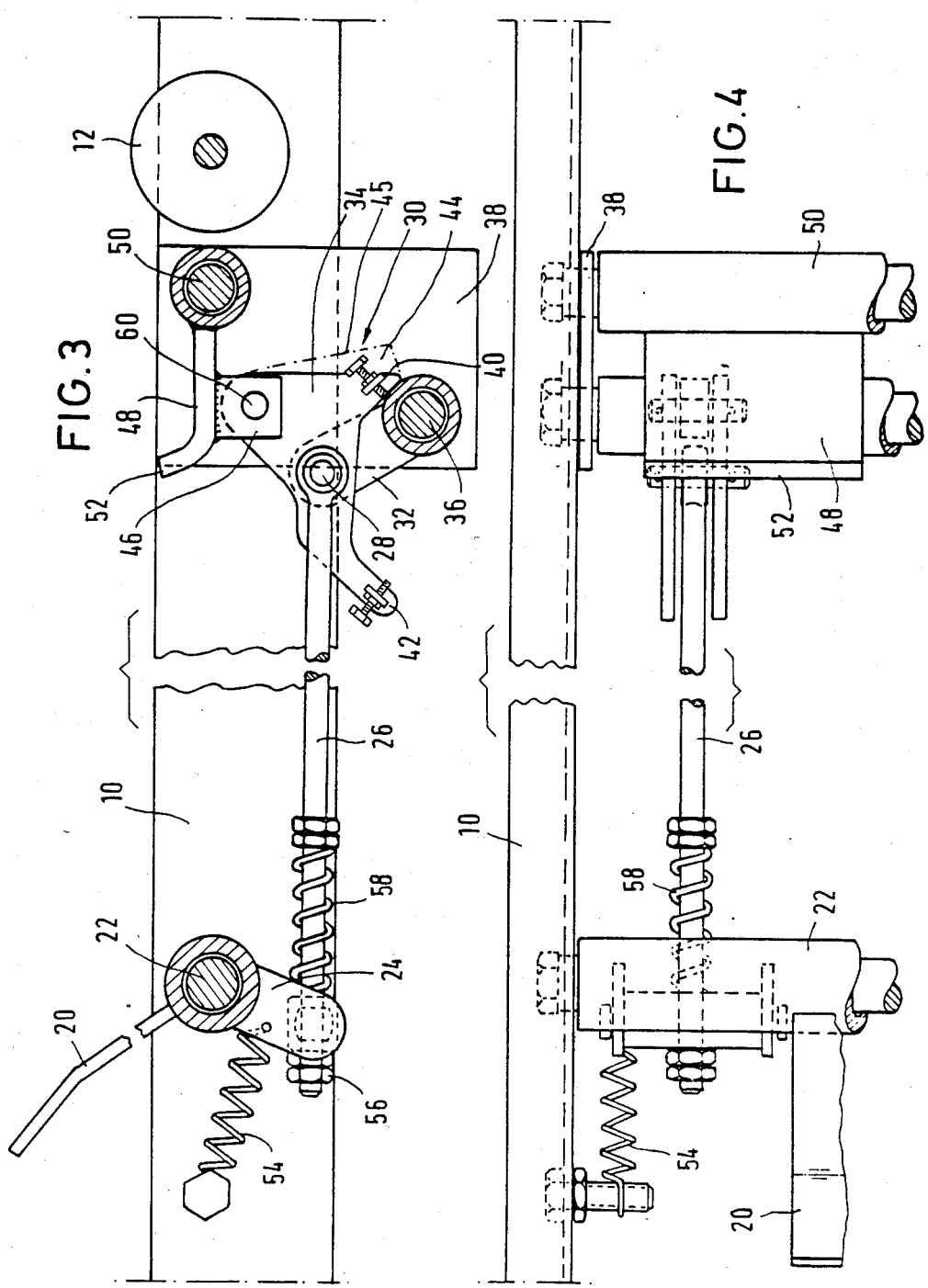

APPARATUS FOR THE SEPARATION OF PALLETS ON A ROLLER CONVEYOR

BACKGROUND OF THE INVENTION

The invention relates to an apparatus for separating a pallet which is to be extracted from a removal position at a removal side of a roller conveyor, more particularly a live rack, from the pallets running after the first-mentioned pallet over braking rollers, with a control flap which is articulated to the end of the roller conveyor, and with a stop latch which is connected to the the control flap by a rod and which is pivotably attached to the roller conveyor with spacing after the pallet which is to be extracted, the stop latch being pivotably attached to the free end of one arm of a toggle mechanism and the other arm of the toggle mechanism being pivotably arranged on a bearing on the roller conveyor, and the rod is connected to the toggle joint, and there are arranged on the toggle mechanism a stop for limiting the extending movement of the toggle mechanism and an abutment for the stop.

An apparatus of this kind is known from German OS No. 31 29 318. There, a stop is welded on the stationary articulation of the toggle mechanism, at right angles with respect to the lower arm of the toggle mechanism, and on the roller conveyor an abutment is arranged which consists of an adjustable screw. In this known apparatus a stop for limiting the collapsed position of the toggle mechanism is not provided. In addition there is the fact that the known stop involves manufacturing difficulties owing to the requisite precise angle adjustment. The known apparatus comprises a plurality of individual parts which have to be assembled and welded-on, and a very great deal of adjustment work is required at the time of fitting.

The invention has as its object to improve the known apparatus in the sense that welding and adjustment work with the outlay thereon can be obviated.

SUMMARY OF THE INVENTION

The preceding object is achieved according to the present invention in that one of the two arms of the toggle mechanism is constructed with two projections. Preferably the projections are constructed integrally with the arm. Thus it is possible for example to stamp out the toggle mechanism arm with the projections, thereby reducing the cost and the manufacturing problems.

According to a preferred form of embodiment of the invention the stationary articulation of the lower toggle mechanism arm acts as an abutment for the projections both in the collapsed position and also in the extended position of the toggle mechanism. In the extended position the stop latch projects into the pallet path so that the pallets are prevented from shifting along further. The rod displaced rearwardly by means of the control flap has so rocked the toggle mechanism arm articulated to the stop latch that the projection bears against the stationary bearing of the lower toggle mechanism arm, whereby the extended position of the toggle mechanism is limited. When the control flap is swung upwards the rod is displaced forwardly, so that the toggle mechanism has been shifted into the collapsed position. In this position the other projection which is on the toggle mechanism arm articulated to the stop latch bears against the other side of the stationary bearing of the lower toggle mechanism arm. Thus the movement of the stop latch is stopped, so that no further tractive forces can act on the said stop latch via the rod.

According to a further form of embodiment of the invention the stationary arcitulation of the lower toggle mechanism arm represents the abutment in the collapsed position and the articulation of the stop latch represents the abutment in the extended position. In this case there is constructed at one side of the toggle mechanism arm articulated to the stop latch an appropriate-width projection which in the collapsed position bears from above against the stationary bearing of the lower toggle mechanism arm and in the extended position bears from below against the bearing of the stop latch.

In a further feature of the invention, adjustable stop elements can be arranged on the projections, these elements being constructed more particularly as locked screws.

BRIEF DESCRIPTION OF THE DRAWINGS

Examples of embodiment of the invention are described with reference to the drawings. In these drawings:

FIG. 1 shows a diagrammatic view of first form of embodiment of an apparatus with a pallet situated in the removal position.

FIG. 2 shows diagrammatically the apparatus according to FIG. 1 with a pallet running into the removal position.

FIG. 3 shows on a larger scale the apparatus according to FIG. 1 in side view with a variant shown in dash-dot lines.

FIG. 4 shows on a larger scale a plan view of the apparatus shown in FIG. 3.

DETAILED DESCRIPTION OF THE PREFERRED EMBODIMENT

FIG. 1 shows a longitudinal bearer 10 of a live rack, on which rollers 12 are arranged. The reference numeral 14 designates a braking roller which has the task of braking a pallet 16 arriving via the roller conveyor so that this pallet travels onwards at a constant speed. Braking rollers 14 are also arranged at the rear portion of the roller conveyor, so that all following pallets do not exceed a specific speed. No braking rollers are provided in the front removal region of the roller conveyor.

A pallet 18 which is to be extracted from the rack is situated in the front region of the roller conveyor, a control flap 20 bearing against the underside of this pallet. This control flap 20 is pivotable about a pin 22. On this pivot pin 22 there is arranged a lever 24 which is directed downwards in the illustration and to which a rod 26 is pivotably attached. At its other end the rod 26 is pivotably connected to the articulation 28 of a toggle mechanism 30. The toggle mechanism comprises an arm 32 and an arm 34. The arm 32 is secured at its other end on a pivot pin 36, which is mounted pivotably on a bearing plate 38 arranged on the longitudinal bearer 10 of the live rack. The toggle mechanism arm 32 is constructed for example as a short strip.

The other arm 34 of the toggle mechanism 30 is pivotably connected to a stop latch 48 by way of a bearing plate 46. This stop latch 48 is secured at one end on a pivot pin 50 which is mounted rotatably between the longitudinal bearers 10 of the live rack. The stop latch 48 is bent at its free end 52. When the control flap 20 is not depressed by a pallet 18, the stop latch takes up the position shown more particularly from FIG. 3. The bent end 52 is then disposed in the space between the longitudinal bearers 10 and does not project above the rollers 12 or 14 into the path of the traveling pallets 16.

The lever 24, which is arranged on the pivot pin 22 of the control flap 20, is acted upon by a tension spring 54 which when the control flap 48 is not under load holds the apparatus in the non-blocking position, i.e. the toggle mechanism 30 is situated in its collapsed position.

To limit this collapsed position, the toggle mechanism arm 34 is provided, beyond the line connecting the toggle mechanism articulation 28 to the articulation 60 on the bearing plate 46, with a projection 40 which is given such an angled construction that at the end of the collapsing movement it abuts against the pivot pin 36 of the lower toggle mechanism arm 32. As a result, further pivoting movement of the stop latch 48 in the downward direction is prevented.

To define the extended position of the toggle mechanism 30 there is constructed on the arm 34 at that side of the connecting line between the articulations 28 and 60 which is opposing from the projection 40 a projection 42 in the form of a finger which, in the maximum extended position of the toggle mechanism 30, abuts against the front side of the pivot pin 36 of the lower toggle mechanism arm. This position is shown more particularly in FIG. 1.

Alternatively to the finger-form projection 42 the projection 40 can be widened as illustrated in chain-dot lines in FIG. 3. This widening 44 is so chosen that in the extended position of the toggle mechanism 30 the edge surface 45 abuts against the underside of the pivot pin 50 of the stop latch 48. Thus further pivoting movement of the toggle mechanism 30 is obviated. It is also conceivable to provide the lower toggle mechanism arm 32 with stops at the side directed towards the pivot pin 50, in which case the pivot pin 50 acts as an abutment for the appropriate projection in the collapsed position and in the extended position.

The rod 26, which is pivotably connected at one end to the lever 24 and at the other end to the articulation 28 of the toggle mechanism 30, can be adjusted in length by means of nuts 56. To ensure that the stop latch projects into the path of the following pallets before the control flap 20 is fully depressed, a compression spring 58 is provided whereby the spacing between the articulation points of the rod 26 in the non-blocking state is longer than the spacing in the blocking state. When the control flap 20 is depressed, the rod 26 is displaced rearwardly, whereby the toggle mechanism 30 is changed into its extended position. In this position the finger-like projection 42 bears on the pivot pin 36 or the edge surface 45 of the projection 44 bears on the pivot pin 50 of the stop latch. When the control flap is fully pressed-down, by means of the lever 24 the compression spring 58 is pushed rearwardly until the end position of the control flap 20 is reached. The front end of the rod 26 then projects out of the bearing eye of the lever 24.

By means of the rod 26 the toggle mechanism is pressed-through until the articulation 28 is a short distance behind the straight line passing through the pivot pin 36 and the pivot pin 60 of the arms 32 and 34 respectively. As a result it is ensured that the pressure exerted by the following-on pallets on the latch 48 is not transmitted through the rod 26 to the control flap 20, but instead the pressure is transmitted through the stop 40 and the pivot pin 36 into the side bearers 10 of the live rack. In the blocking position the control flap is accordingly fully relieved of load.

The pivot pins 22 and 50 are secured in the rows of holes provided for the rollers. Additional bores, which would cause weakening of the longitudinal bearers, are therefore not necessary.

FIG. 2 shows diagrammatically the position of the apparatus when the pallet 18 has been removed from the live rack. The tension spring 54 turns the control flap 48 into its upwardly directed position, whereby at the same time the rod 26 is drawn forwardly and the toggle mechanism is changed from its extended position into the inflected position. In this position the finger-like projection 42 bears against the front side of the pivot pin 36. Connected with this is a downward pivoting movement of the stop latch 48, so that owing to its own weight the pallet can run further forwardly on the rollers 12 mounted in the slopingly arranged side bearers 10. As soon as the pallet 16 has run up to the control flap 20 the latter is moved downwardly, with the result that the stop latch 48 is swung upwardly. In this way it is ensured that a further following pallet is retained by the stop latch 48.

At the front end the longitudinal bearers 10 bear on a transverse bearer 62. An end stop 64, which may also be constructed in the form of a ramp shoe, prevents a following pallet from running off the live rack.

What is claimed:

1. An apparatus for use with a roller conveyor for conveying a plurality of pallets, said roller conveyor including a removal position at one end thereof and having braking rollers at locations therealong spaced from said removal position, said apparatus being operative to separate one of said pallets which is to be extracted from the removal position from the others of said pallets running after said one pallet over the braking rollers, said apparatus comprising:

a control flap pivotably mounted at the removal position of the roller conveyor and disposed to be contacted by the pallet at the removal position;

first and second spaced apart pivot pins rigidly mounted to a portion of said roller conveyor spaced from the removal position;

a stop latch pivotably mounted to the first pivot pin, said stop latch being pivotable between an extended position for blocking the movement of the pallet toward the removal position and a collapsed position for permitting at least one said pallet to advance into the removal position;

a toggle mechanism comprising first and second arms articulated to one another, said first arm being pivotably mounted to said stop latch at a location thereon spaced from the first pivot pin, said second arm being pivotably mounted to said second pivot pin, such that the articulation of said toggle mechanism causes said stop latch to pivot around said first pivot pin, said first arm of said toggle mechanism comprising first and second projections dimensioned to alternately pivot into abutment with at least one of said first and second pivot pins for defining a range of articulation for said toggle mechanism and both the extended and the collapsed positions of said stop latch; and a rod extending from said control flap to a location on said toggle mechanism spaced from said second pivot pin and from said stop latch such that pivotable movement of said control flap causes simultaneous movement of said rod, articulation of said toggle mechanism and pivotable movement of said stop latch between said extended and collapsed positions as defined by said projections.

2. Apparatus according to claim 1, characterized in that the projections are constructed integrally with the first toggle mechanism.

3. Apparatus according to claim 1, characterized in that the second pivot pin defines the abutment for the projections in both the collapsed position and in the extended position of the stop latch.

4. Apparatus according to claim 1, characterized in that the second pivot pin defines the abutment in the collapsed position of the stop latch and the first pivot pin defines the abutment in the extended position of the stop latch.

5. Apparatus according to claim 1, characterized in that adjustable stop elements are arranged on the projections.

6. Apparatus according to claim 5, characterized in that the stop elements are locked screws.

* * * * *